United States Patent [19]

Schulze et al.

[11] Patent Number: 5,045,699
[45] Date of Patent: Sep. 3, 1991

[54] HEAT IMAGING CAMERA WITH A COOLED DETECTOR MOSAIC

[75] Inventors: Bernd Schulze, Taufkirchen; Siegfried Craubner, Wessling; Guenter Lange, Egmating, all of Fed. Rep. of Germany

[73] Assignee: Deutsche Airbus GmbH, Hamburg, Fed. Rep. of Germany

[21] Appl. No.: 466,294

[22] PCT Filed: Aug. 3, 1989

[86] PCT No.: PCT/DE89/00513

§ 371 Date: Apr. 2, 1990

§ 102(e) Date: Apr. 2, 1990

[87] PCT Pub. No.: WO90/01688

PCT Pub. Date: Feb. 22, 1990

[30] Foreign Application Priority Data

Aug. 3, 1988 [DE] Fed. Rep. of Germany ....... 3826379

[51] Int. Cl.$^5$ .......................... G01M 9/00; G01J 5/00; G01P 5/10
[52] U.S. Cl. .................................... 250/330; 250/332; 250/334; 250/347; 250/352
[58] Field of Search ............... 250/330, 332, 334, 347, 250/352, 353

[56] References Cited

U.S. PATENT DOCUMENTS

| | | |
|---|---|---|
| 3,977,244 | 8/1976 | Stone . |
| 4,507,551 | 3/1985 | Howard et al. ................ 250/353 X |
| 4,590,375 | 5/1986 | Rovati et al. .................. 250/330 X |
| 4,783,593 | 11/1988 | Noble ................................. 250/352 |

FOREIGN PATENT DOCUMENTS

| | | |
|---|---|---|
| 35587 | 9/1981 | European Pat. Off. . |
| 0300130 | 1/1989 | European Pat. Off. ........... 250/352 |
| 2901625 | 7/1980 | Fed. Rep. of Germany . |
| 63-27766 | 2/1988 | Japan . |

OTHER PUBLICATIONS

D. M. Heath et al., "Remote Noncontacting Measurements of Heat Transfer Coefficients for Detection of Boundary Layer Transition in Wind Tunnel Tests" ICIASF 1987.

A. M. Bouchardy et al., "Processing of Infrared Thermal Images for Aerodynamic Research" Spie, vol. 397, pp. 304–309.

D. A. Dress et al., "Cryogenic Wind Tunnel Research: A Global Perspective", Cryogenics, vol. 28, No. 1, Jan. 1988.

Primary Examiner—Constantine Hannaher
Assistant Examiner—Edward J. Glick
Attorney, Agent, or Firm—W. G. Fasse; D. H. Kane, Jr.

[57] ABSTRACT

A heat imaging camera (3) for sensing convective conditions in boundary layer flows occurring on wind tunnel models (2), particularly at cryogenic temperatures, scans the model from the outside, thereby detecting the temperature distribution on the model surface. Detectors (9) that are sensitive to the long-wave infrared spectrum range are part of the camera and convert the heat information into electrical signals. The temperature distribution is displayed pictorially and graphically with the help of an evaluation unit (50). The detectors (9) are grouped in a detector mosaic (10) in the camera (3).

8 Claims, 5 Drawing Sheets

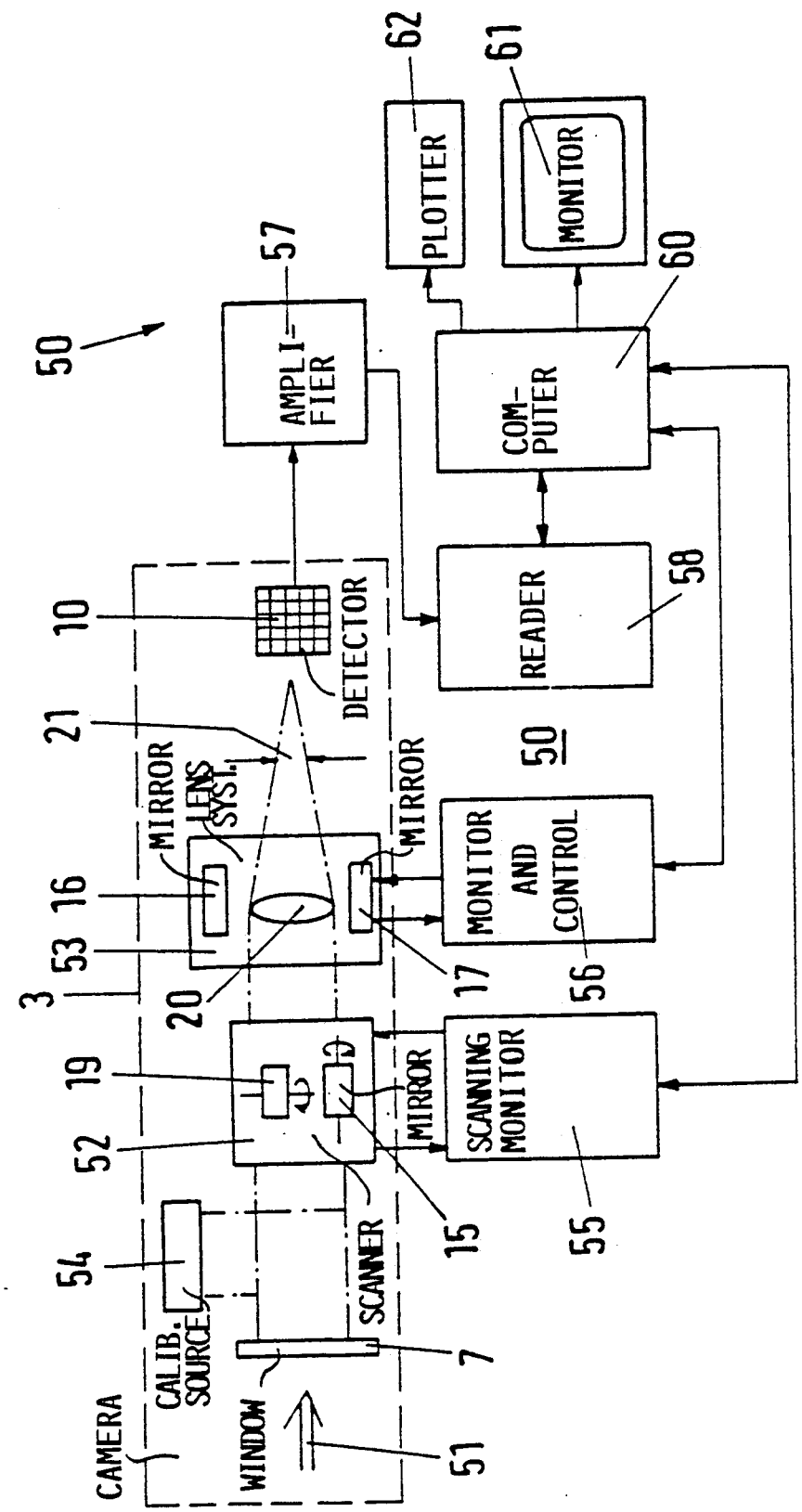

HEAT IMAGING CAMERA WITH A COOLED DETECTOR MOSAIC

FIELD OF THE INVENTION

The invention relates to a heat imaging camera with a cooled detector mosaic for sensing convective conditions on a surface.

BACKGROUND INFORMATION

Such a heat imaging camera is known from EP 0,035,587 Al. The heat imaging camera described therein has a detector field with detectors sensitive in the infrared spectrum range. The camera detects temperature distributions and converts them to electrical signals. Furthermore, the temperature distribution is pictorially and graphically displayed with the aid of an evaluation unit.

A method for sensing convective conditions in boundary layer flows occurring on wind tunnel models, is known from the DE-OS 2,901,625, which discloses the analogy of heat and impulse transfer for sensing convective conditions in boundary layer flows occurring on wind tunnel models to determine temperature distributions.

OBJECTS OF THE INVENTION

It is an object of the invention to further develop the construction of a heat imaging camera so that it is suitable for sensing flow images in a cryogenic wind tunnel.

SUMMARY OF THE INVENTION

The heat imaging camera according to the invention is characterized in that its detectors for sensing convective conditions on the surface of a wind tunnel model at the temperature of the liquid nitrogen, are sensitive in the long-wave infrared and are cooled in a high vacuum with liquid helium, that the optical system of the camera is cooled with liquid nitrogen and is automatically adjustable to focus on the surface of the model, and in that a computer is connected to the camera for converting the temperature image into a flow image.

The essential advantage of the invention lies in the fact that the conditions of boundary layer flows on wind tunnel models are sensed from the outside with the aid of the heat imaging camera according to the invention, particularly at low temperatures. Thus, the flow boundary layer can be sensed in a temperature range from 80° to 350° Kelvin with a high temperature resolution of 0.1 Kelvin, a spatial resolution of up to 2 mrad, and a chronological resolution of approximately 0.5 million image elements per second. Silicon detectors, such as doped silicon detectors, operated as extrinsic photoconductors and sensitive to the long-wave infrared spectrum range of approximately 10 to 30 μm are used for application in the cryogenic wind tunnel and are cooled to the temperature of liquid helium. The scene to be measured is scanned according to the so-called "step-and-stare method", whereby an individually programmed scanning pattern containing scanning units, senses the contours of the wind tunnel model.

With the aid of the apparatus according to the invention, shear stress fields resulting from convection on the surface of the model, laminar-turbulent transitions in the boundary layer flow, areas of flow separation, and the dynamic behavior in the boundary layer flow in the cryogenic wind tunnel can be determined at flight Reynolds numbers and displayed. The invention provides substantial savings in the operation of cryogenic wind tunnels and substantial improvements in performance through laminarizationon flight equipment and thus, a greater economic efficiency thereof.

BRIEF DESCRIPTION OF THE DRAWINGS

Example embodiments of the invention are explained in more detail below, with reference to the accompanying drawings, wherein:

FIG. 5 is a block diagram for the apparatus according to FIG. 1, including an evaluation unit.

DETAILED DESCRIPTION OF PREFERRED EXAMPLE EMBODIMENTS AND OF THE BEST MODE OF THE INVENTION

Figure 1:
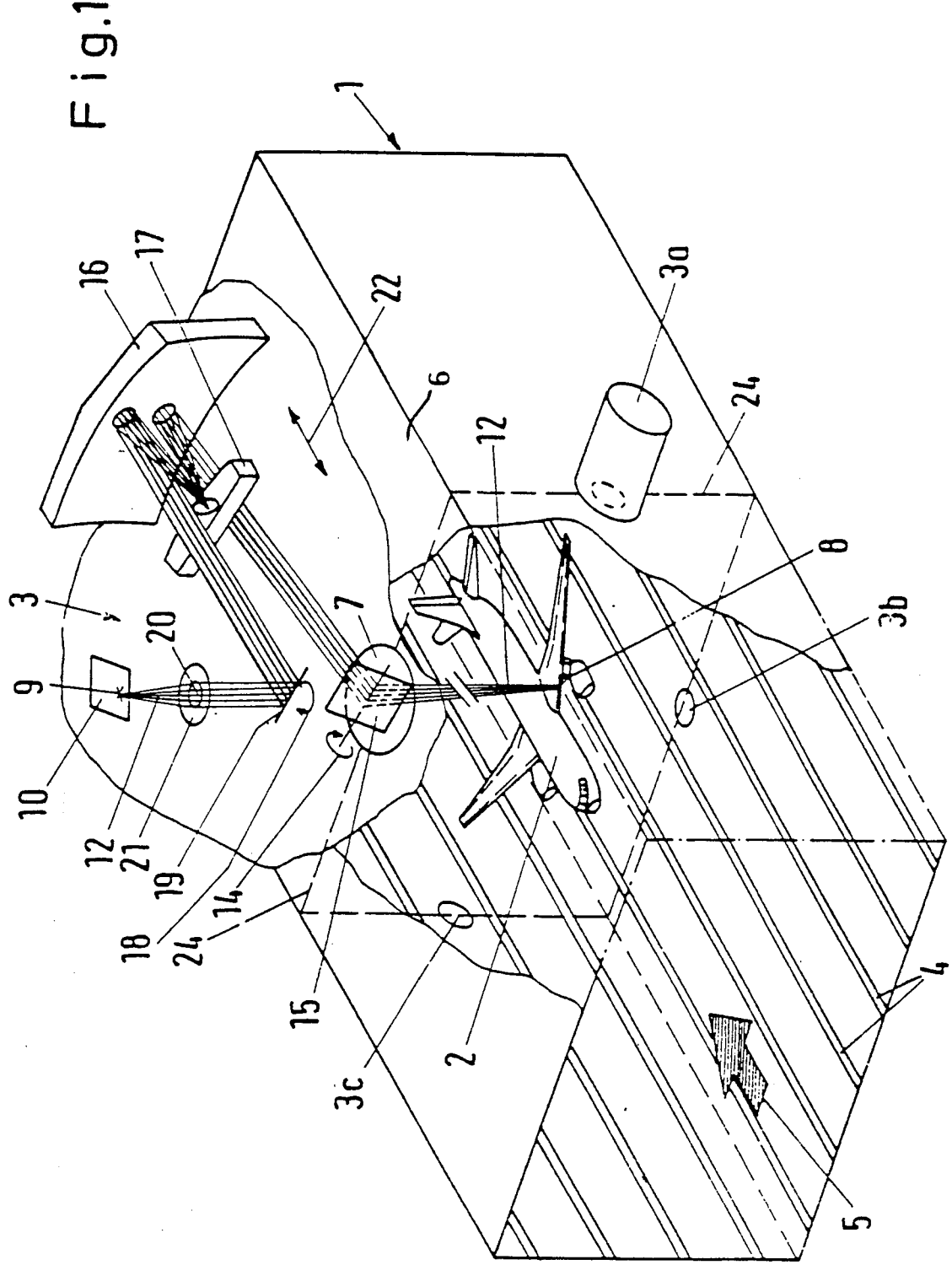
FIG. 1 shows a wind tunnel with an apparatus for sensing conditions of boundary layer flows on a model.

As shown schematically in FIG. 1, an airplane model 2 is suspended in a cryogenic, closed-circuit wind tunnel 1 in which a camera 3 senses the conditions of boundary layer flows occurring on the airplane model 2 when the wind tunnel 1 is operated. The wind tunnel 1 shown here has grooves 4 in the walls for flow-technical reasons. The direction of the flow medium is indicated by an arrow 5. Nitrogen is used as the flow medium, which allows test conditions from 80° to 350° Kelvin. The camera 3 is mounted above the ceiling 6 of the wind tunnel 1; it looks through a window 7 in the ceiling 6 onto the model 2. When flow is applied to the model 2 by the flow medium, slight temperature variations occur on the surface of the model 2. These temperature variations are then detected by the camera 3 with detectors that are sensitive to the long-wave infrared spectrum range of approximately 10 to 30 μm.

FIG. 1 shows the path of the infrared radiation from a point 8 on the leading edge of the wing of model 2 to a detector 9 of a detector mosaic 10. A pointed ray 12 in the infrared wave range passes through the window 7 which is transparent to infrared waves, into the camera 3 and is deflected by a mirror 15 tiltable in the direction of the arrow 14, onto a spherical mirror 16; from there the rays are bundled and bounced off a second spherical mirror 17 back again to the first spherical mirror 16, from there deflected via a mirror 19 tiltable in the direction of the arrow 18, and through a lens 20 with a scattered light aperture 21 onto the detector 9 where the infrared waves from point 8 are converted into electrical signals on which a flow image is based. The spherical focusing mirror 17 can be moved in the direction of arrow 22 to adjust the focus. Additional cameras 3a, 3b, and 3c are arranged together with camera 3 in a measuring plane 24, for sensing all boundary layer areas of the model 2. An evaluation unit for optical and graphic display of the boundary layer flows of the image elements sensed in the detector mosaic is explained below with reference to FIG. 5.

Figure 2:
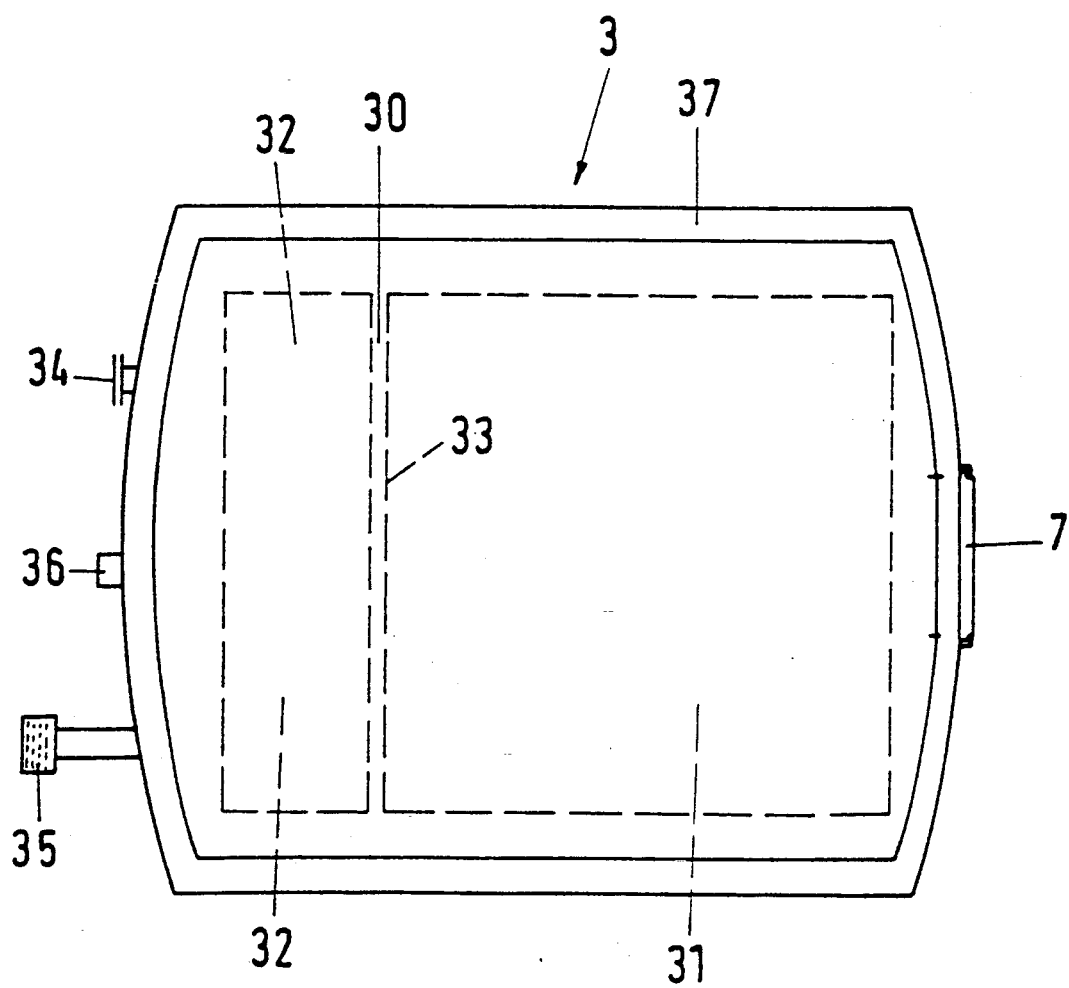
FIG. 2 shows a camera for the apparatus according to FIG. 1.

FIG. 2 shows the basic arrangement of the camera 3. Inside the camera, a narrow chamber 30 for the detector mosaic 10 separates two chambers 31 and 32 from each other. All parts of the optical system described with reference to FIG. 1 are arranged in chamber 31 in a nitrogen atmosphere. This makes it possible to adapt the temperature in chamber 31 to the temperature of the wind tunnel, thereby ensuring a high degree of mechanical accuracy. Camera 3 is cooled with liquid helium whereby the chamber 32 serves as the helium reservoir. The narrow chamber 30 for the detector mosaic is evacuated and cooled to a temperature of approximately 10° K. by the neighboring chamber 32. The window 7, transparent to infrared waves, is located on the right side. A connection nipple 34 for evacuating the detector chamber 30, a filler port 35 for filling in helium, and a cable connection 36 for operating and controlling the camera are provided on the opposite side. The camera is enclosed in an insulating jacket 37.

Figure 3:
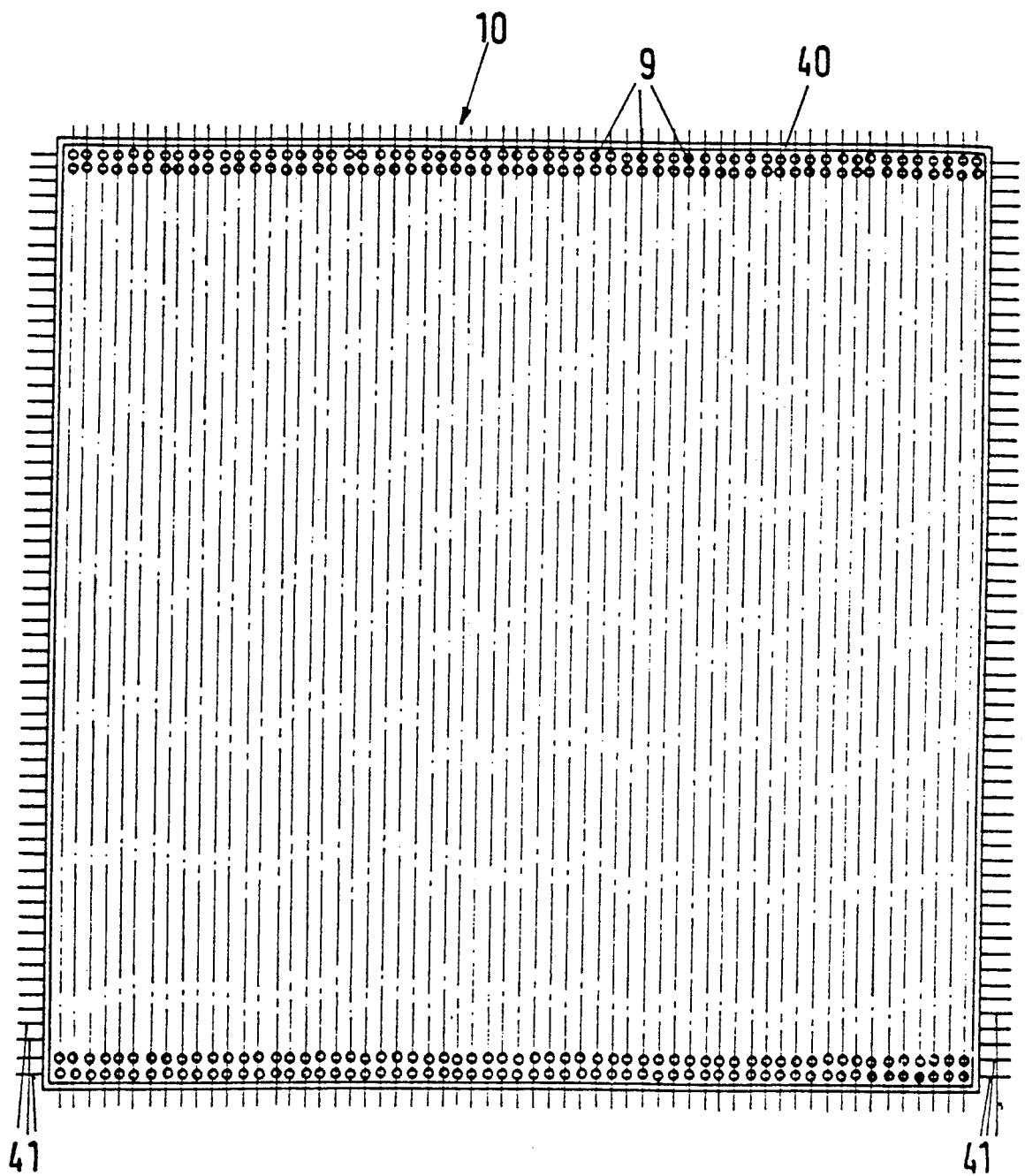
FIG. 3 shows a detector mosaic for the camera according to FIG. 2.

FIG. 3 shows schematically the detector mosaic 10 that is used in the camera 3. 60×60 single detectors 9 are arranged on a plate 40. Only the two upper and lower rows with 60 detectors each are shown in FIG. 3. Between these rows another 56 rows of detectors are arranged in the same manner. Conductors 41 lead out from each of the detector rows. In practice, a size corresponding to the smallest image element (pixel) of approximately 2 mm×2 mm is preferred. A spatial resolution of 2 mrad is possible when the detector mosaic 10 is a distance of 1 m from model 2. This large resolution allows the conditions of boundary layer flows to be displayed with a degree of accuracy that is not possible with other means. A temperature resolution of approximately 0.1° K. can be obtained with detectors made of doped silicon. It is technically quite possible to use detector mosaics containing a different number of detectors, thereby obtaining an even greater chronological resolution.

Figure 4:
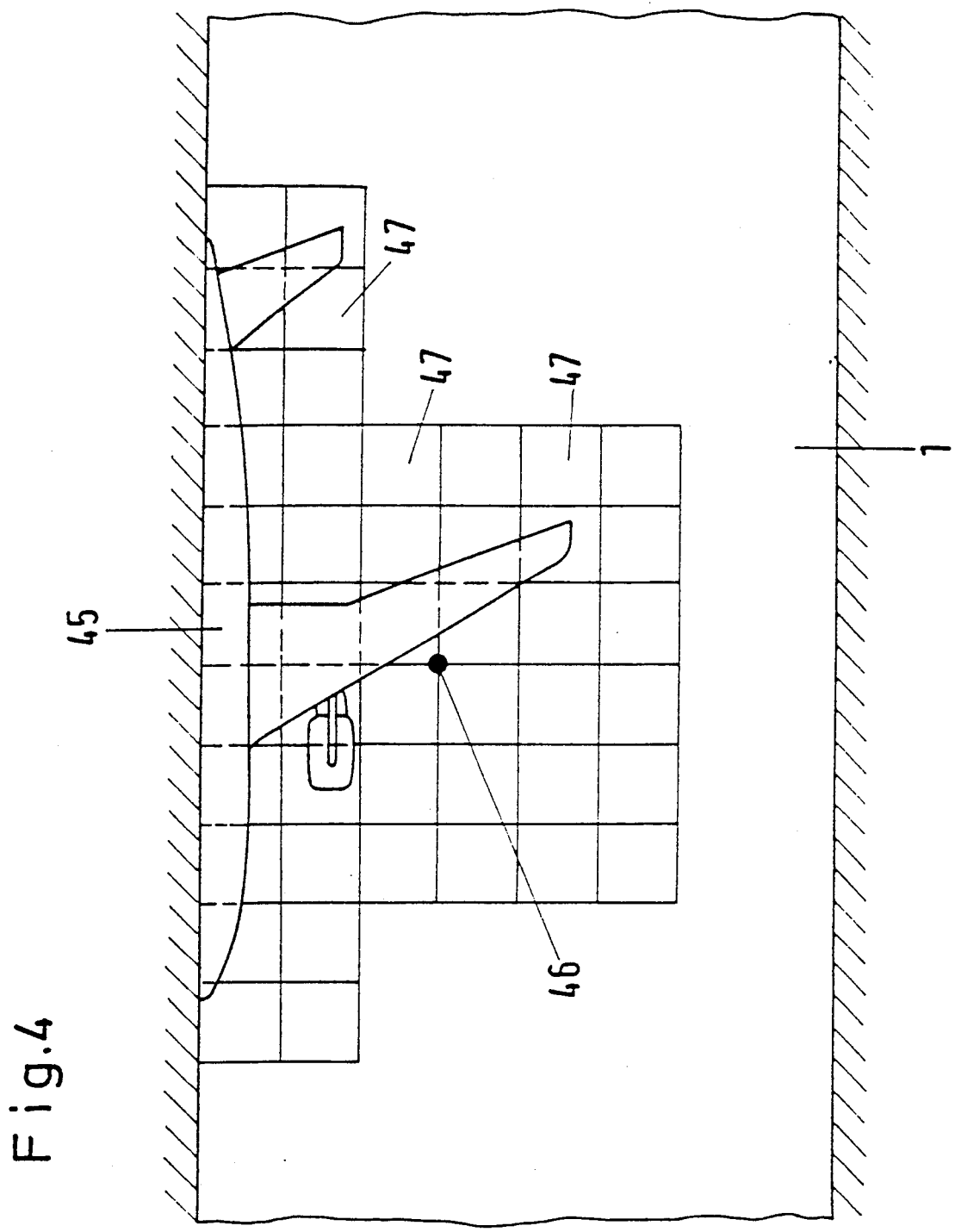
FIG. 4 is a top view of another half-model of a wind tunnel with a layout of scanning units.

FIG. 4 shows a half-section cut through the wind tunnel 1 with the top view onto a half-model 45. The window 7 of camera 3, not shown here, is situated above a point 46. Square scanning units 47 are arranged on and around the half model 45 for a rational display of the boundary layer flows. The size of the units is such that each one can be mapped simultaneously on the detector mosaic 10. Thus, with the camera 3 adjusted according to FIG. 1, each scanning unit 47 is scanned simultaneously by all detectors 9, and transmitted to the evaluation unit to be stored. After scanning the entire image, it is possible to display a calibrated heat image, as will be explained below with reference to FIG. 5. The temperature profiles identify the temperatures corresponding to the state of the boundary layer flow that exist on the surface and in the environment of the model 45.

FIG. 5 shows a block diagram representing the complete apparatus. The part enclosed within the dashed line encompasses the components for the camera 3; the other blocks represent an evaluation unit 50. Within the area of camera 3, the infrared rays coming in from model 2 are depicted by an arrow 51 and, within the camera, by dash-dotted lines. The infrared rays enter the camera through the window 7 not shown in FIG. 5, pass through the scanning apparatus or scanner 52 with the rotatable deflecting mirrors 15 and 19, through the lens system 53 with the lens 20 and the two spherical mirrors 16 and 17, and pass further through the scattered light aperture 21 and are focused on the detector mosaic 10. A calibration source 54 inside the camera 3 serves for compensating the different sensitivities of the detectors with each new measuring operation. The evaluation unit 50, installed outside the camera 3, provides a scanning monitor 55, a monitor and control device 56 for the movable focusing spherical mirror 17 and for the scattered light aperture 21, an amplifier 57 for the electrical detector signals, an electronic reader 58 for the scanning operation, a computer 60, a color monitor 61, and a plotter 62. The components the evaluation unit 50 are connected to each other in the usual manner by electrical conductors. From the layout of these conductors and the arrangement of the arrows it can be seen that all components of the evaluation unit, the storage of the signals from the detectors, and also the digital-to-analog conversion for the color monitor 61 and the plotter 62, are controlled by the computer 60.

Because the image elements sensed by the individual scanning units 47 (see FIG. 4) are stored, the boundary layer flows on the model 2 or 45 can be seen as a nonreactive display or flow image on the color monitor 61. For example, the laminar-turbulent transition in the boundary layer flow, the areas of flow separation, the coupling of non-steady motions and other dynamic behavior in the boundary layer flow, which are otherwise difficult to display, are shown in detail.

Although the invention has been described with reference to specific example embodiments, it will be appreciated that it is intended to cover all modifications and equivalents within the scope of the appended claims.

We claim:

1. A heat imaging camera system, comprising cooled detector means sensitive within the long-wave infrared range for sensing convective conditions on a model surface, means for cooling said model surface at the temperature of liquid nitrogen, means for cooling said detector means with liquid helium, optical means cooled with liquid nitrogen, said optical means including means for automatically focussing said optical means on said model surface and arranged to transmit infrared signals representing said convective conditions onto said helium cooled detector means, and a computer connected for converting a temperature image into a displayable image.

2. The heat imaging camera of claim 1, wherein said optical means comprise a lens system (20) with a scattered light aperature (21), a two-axis optical scanning mechanism, a dynamic focussing device, and a window (7) transparent to infrared radiation.

3. The heat imaging camera of claim 2, wherein said two-axis optical scanning mechanism comprises a deflecting mirror (19) that oscillates about a vertical high axis, and a deflecting mirror (15) that oscillates device comprises a double mirror arrangement with a fixed spherical mirror (16) and a movable focussing spherical mirror (17).

4. The heat imaging camera of claim 1, wherein said model surface is scanned step by step according to the step-and-stare method, whereby, after each step, said detector means scans one scanning unit of a plurality of scanning units (47) to be sensed, said plurality of scanning units being distributed over an image area, for sensing by said detector means emitted infrared radiation.

5. The heat imaging camera of claim 4, wherein said detector means comprise a square detector mosaic (10).

6. The heat imaging camera of claim 1, wherein said model surface is scanned with a continuous scanning motion, whereby said detector means is guided in a continuous motion across an image field, and wherein detected signals are read out continuously.

7. The heat imaging camera of claim 3, further comprising an evaluation unit (50) including a scanning monitor (55) for said deflecting mirrors (15,19), a device for monitoring and controlling said scattered light aperature and for said movable focussing spherical mirror, an amplifier for amplifying signals of said detector means, an electronic read-out for said scanning mechanism, and wherein said computer controls all units, a color monitor for displaying said displayable image, and a plotter.

8. The heat imaging camera of claim 1, wherein said means for cooling said model surface comprise a wind tunnel.

* * * * *

UNITED STATES PATENT AND TRADEMARK OFFICE
CERTIFICATE OF CORRECTION

PATENT NO. : 5,045,699
DATED : September 3, 1991
INVENTOR(S) : Bernd Schulze et al.

It is certified that error appears in the above-identified patent and that said Letters Patent is hereby corrected as shown below:

Claim 3, column 4, line 50, after "oscillates" insert
--about a horizontal axis, and wherein said
dynamic focussing--;

Claim 7, column 5, line 5, replace "ature" by --ture--.

Signed and Sealed this

Twenty-ninth Day of December, 1992

Attest:

DOUGLAS B. COMER

*Attesting Officer*  *Acting Commissioner of Patents and Trademarks*